(12) United States Patent
Landrot et al.

(10) Patent No.: US 6,679,535 B2
(45) Date of Patent: Jan. 20, 2004

(54) SAFETY WHEEL, METHOD OF MANUFACTURING SUCH A WHEEL AND BOGIE EQUIPPED WITH SUCH A WHEEL

(75) Inventors: Alain Landrot, Le Creusot (FR); François Demilly, Dunkerque (FR)

(73) Assignees: Alstom Holdings, Paris (FR); Valdunes, Puteaux (FR)

( * ) Notice: Subject to any disclaimer, the term of this patent is extended or adjusted under 35 U.S.C. 154(b) by 185 days.

(21) Appl. No.: 09/443,464

(22) Filed: Nov. 19, 1999

(65) Prior Publication Data

US 2003/0075942 A1 Apr. 24, 2003

(30) Foreign Application Priority Data

Nov. 19, 1998 (FR) .............................. 98 14734

(51) Int. Cl.$^7$ .............................................. B60B 19/00
(52) U.S. Cl. .................... 295/31.1; 295/30; 188/218 R; 29/894.01; 148/583; 104/243
(58) Field of Search ............................... 301/6.7; 295/1, 295/30, 31.1, 34; 148/569, 583; 188/218 R; 29/894.01; 104/243, 72.2, 215.2

(56) References Cited

U.S. PATENT DOCUMENTS

| | | | | |
|---|---|---|---|---|
| 234,525 A | * | 11/1880 | Bressler ................. | 188/218 R |
| 254,521 A | * | 3/1882 | Washburn | |
| 388,743 A | * | 8/1888 | Thompson | |
| 463,426 A | * | 11/1891 | Lobdell ...................... | 295/30 |
| 513,546 A | * | 1/1894 | Washburn ................... | 295/30 |
| 560,161 A | * | 5/1896 | Harvey ........................ | 295/30 |
| 988,608 A | * | 4/1911 | Waycott ................. | 188/218 R |
| 1,296,945 A | * | 3/1919 | Gaisler | |
| 1,853,572 A | * | 4/1932 | Nugent | |
| 2,002,901 A | * | 5/1935 | Main | |
| 2,477,029 A | * | 7/1949 | Wood .......................... | 295/30 |
| 3,084,637 A | * | 4/1963 | Kohout | |
| 3,120,820 A | * | 2/1964 | Bingham ................. | 105/215.2 |
| 3,367,160 A | * | 2/1968 | Sperber et al. | |
| 3,532,333 A | * | 10/1970 | Dehn ......................... | 148/583 |
| 5,533,770 A | * | 7/1996 | Clausmeyer et al. ........... | 295/1 |
| 5,913,988 A | * | 6/1999 | Brouke et al. .......... | 148/583 X |

FOREIGN PATENT DOCUMENTS

| | | |
|---|---|---|
| DE | 11 186 900 | 3/1957 |
| EP | 824 993 | 2/1998 |
| FR | 2 741 582 | 5/1997 |
| GB | 2 060 530 | 5/1981 |
| WO | WO 98/43834 | 10/1998 |

* cited by examiner

Primary Examiner—Russell D. Stormer
(74) Attorney, Agent, or Firm—Sughrue Mion, PLLC

(57) ABSTRACT

This invention relates to a safety wheel, for a subway coach bogie, or the like, running on pneumatic tires, adapted to be interposed between a chassis of the bogie and a corresponding tire, said wheel presenting an outer peripheral zone having a braking portion as well as a guiding portion projecting radially outwardly from the braking portion, the hardness of the braking portion being much greater than the hardness of the guiding portion. This may be achieved for example by effecting a selective tempering of the braking portion by peripheral nozzles projecting a cooling liquid. This safety wheel is considerably longer lasting than those of the prior art.

3 Claims, 2 Drawing Sheets

SAFETY WHEEL, METHOD OF MANUFACTURING SUCH A WHEEL AND BOGIE EQUIPPED WITH SUCH A WHEEL

FIELD OF THE INVENTION

The present invention relates to a safety wheel for a subway coach bogie or the like, running on pneumatic tires, to a method for manufacturing such a wheel, and to a subway coach bogie or the like, running on pneumatic tires, equipped with such wheels.

BACKGROUND OF THE INVENTION

A subway coach running on pneumatic tires conventionally comprises two bogies, each of which is fitted with pneumatic tires for rolling, disposed at the lateral ends of the chassis of this bogie. Between this chassis and each tire there is interposed a so-called safety wheel, coaxial to the tire and made of steel.

Each safety wheel presents a peripheral portion forming rim, comprising a braking portion or table, extending radially outwardly by a guiding portion or flange. When the subway is operating normally, the bogie rolls on its pneumatic tires, the safety wheels simply performing a function of guiding via their flange. The coach is braked both by current recuperation and mechanically. To that end, the braking table of the safety wheel is subjected to a pressure exerted by the sole of a braking member fast with the chassis. Moreover, in the event of puncture of the pneumatic tire, the safety wheel comes into contact with a rail, via the braking table, which ensures rolling of the coach.

These safety wheels are conventionally made of carbon steel according to type R2 of standard UIC 812-3. The method of producing them consists firstly in heating the wheel above the temperature of austenitization of the steel which consitutes it, i.e. about 890°. The wheel thus heated is subjected to a so-called standardized treatment, consisting in allowing it to cool slowly, without outside thermal action. The wheel thus obtained presents a homogeneous hardness of about 700 to 750 MPa, viz. between 195 and 220 on the Brinell scale.

However, this type of safety wheel presents certain drawbacks. In effect, it has been observed that their braking table is subject to rapid wear, this limiting their use to about 100,000 km in the case of mechanical braking. It is therefore necessary to change these wheels frequently, which leads to additional costs.

In order to overcome the different drawbacks of the prior art set forth hereinabove, the invention proposes a safety wheel which, while ensuring a reliable guiding of the bogie which is equipped therewith, has a longer lifetime than the wheels of the prior art.

SUMMARY OF THE INVENTION

To that end, the invention relates to a safety wheel for subway coach bogie, or the like, running on pneumatic tires, adapted to be interposed between a chassis of the bogie and a corresponding tire, said wheel presenting an outer peripheral zone comprising a braking portion adapted to receive the action of a mechanical braking member, as well as a guiding portion projecting radially outwardly from the braking portion, characterized in that the hardness of the braking portion is much greater than the hardness of the guiding portion.

Within the framework of the invention, the hardnesses of two members are compared from results of conventional tests for measuring the hardness of metals, such as for example the Brinell or Vickers methods.

According to other characteristics of the invention:

on the Brinell scale, the hardness of the braking portion is included between 293 and 311, while the hardness of the guiding portion is included between 195 and 220;

the wheel is made of carbon steel, in accordance with type R2 or type R8 of standard UIC 812-3;

said carbon steel includes, by weight, up to 0.700% of silicon, up to 0.120% of molybdenum and up to 0.400% of chromium.

The invention also relates to a method for producing a safety wheel for subway coach bogie, or the like, running on pneumatic tires, adapted to be interposed between a chassis of the bogie and a corresponding pneumatic tire, in which a steel blank is taken above the temperature of austenitic transformation of said steel, said blank presenting the shape of the definitive wheel and comprising an outer peripheral zone comprising a braking portion, adapted to receive the action of a mechanical braking member, as well as a guiding portion projecting radially outwardly from the braking portion, characterized in that it comprises the following steps of:

effecting a selective tempering of the braking portion of the blank taken above the temperature of austenitic transformation of said steel, without subjecting the guiding portion to this tempering, then heating at least the tempered braking portion in order to effect an operation of annealing of this braking portion, with the result that the hardness of the braking portion of the definitive wheel is clearly greater than the hardness of the guiding portion of this wheel.

According to other characteristics of the invention:

a selective tempering of the braking portion is effected for a duration of between 5 and 15 minutes, so as to take this braking portion to a temperature of between 150 and 250° C.;

the step of selective tempering of the braking portion comprises the following steps of: disposing the blank taken to above the temperature of austenitic transformation of said steel, in substantially horizontal manner, its guiding portion being placed above its braking portion, then spraying the braking portion with a cooling liquid;

at least the tempered braking portion is heated to a temperature of between 850 and 900° C., for a duration of between 2 and 3 hours;

the whole of the blank is heated, after having effected tempering of the braking portion;

said blank is made of a carbon steel in accordance with type R2 or type R8 of standard UIC 812-3;

said carbon steel comprises, by weight, up to 0.700% of silicon, up to 0.120% of molybdenum and up to 0.400% of chromium.

Finally, the invention relates to a subway coach bogie, or the like, running on pneumatic tires, comprising pneumatic tires, a chassis resting thereon and safety wheels of which each is interposed between the chassis and a corresponding tire, characterized in that each safety wheel is such as described hereinabove.

BRIEF DESCRIPTION OF THE DRAWINGS

The invention will be more readily understood on reading the following description given solely by way of non-limiting example, with reference to the accompanying drawings, in which.

DESCRIPTION OF PREFERRED EMBODIMENT

Figure 1:
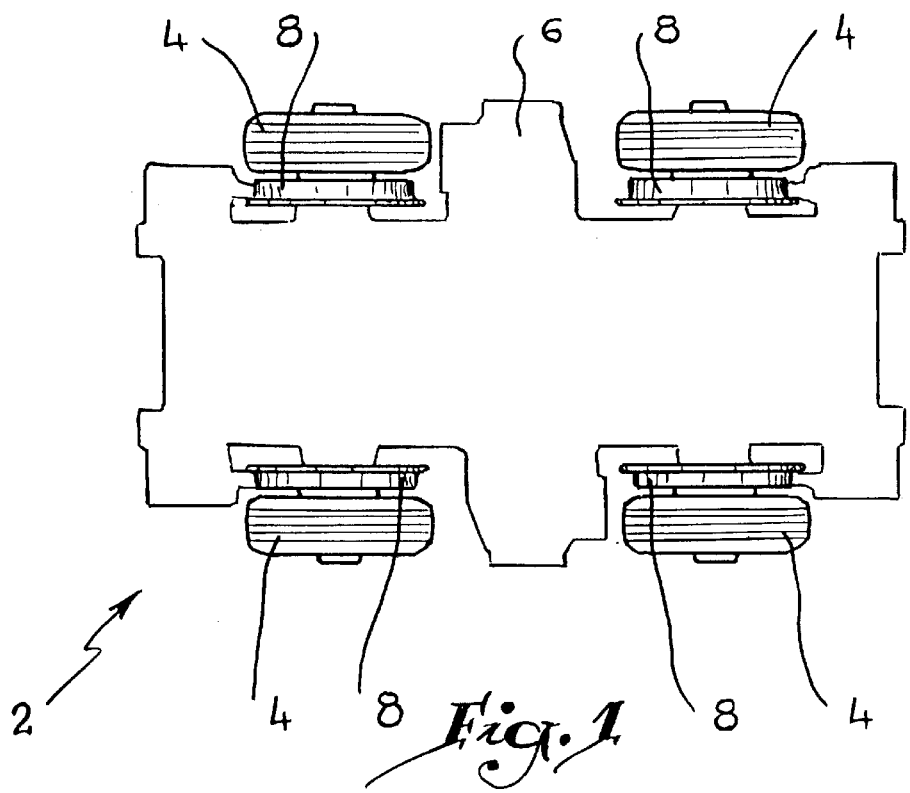
FIG. 1 is a schematic plan view of a subway coach bogie running on pneumatic tires, equipped with safety wheels according to the invention.

Referring now to the drawings, FIG. 1 firstly shows a bogie 2 equipping a subway coach (not shown) running on pneumatic tires. This bogie conventionally comprises pneumatic tires 4 adapted to move over a rolling track (not shown) and which support a central chassis 6. Safety wheels 8, which are interposed between the chassis 6 and each of the tires, are adapted to come into contact with a metal rail in the event of puncture of one of the tires. Each wheel 8 is disposed coaxially with respect to the tire 4 which is adjacent thereto.

Figure 2:
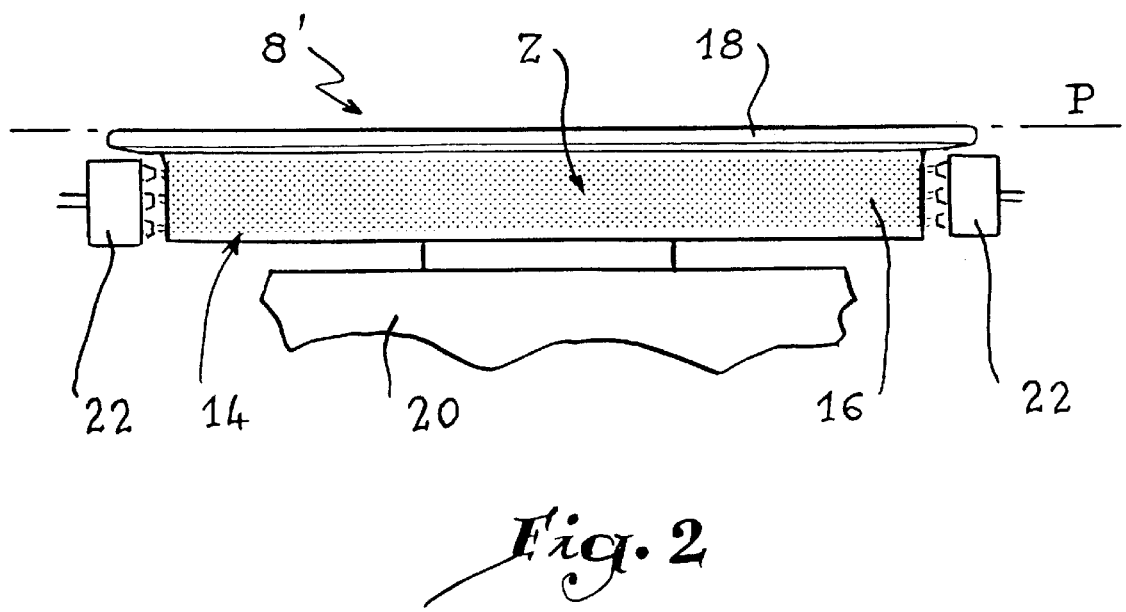
FIG. 2 is a schematic side view illustrating a phase of a method for producing a safety wheel shown in FIG. 1.
Figure 3:
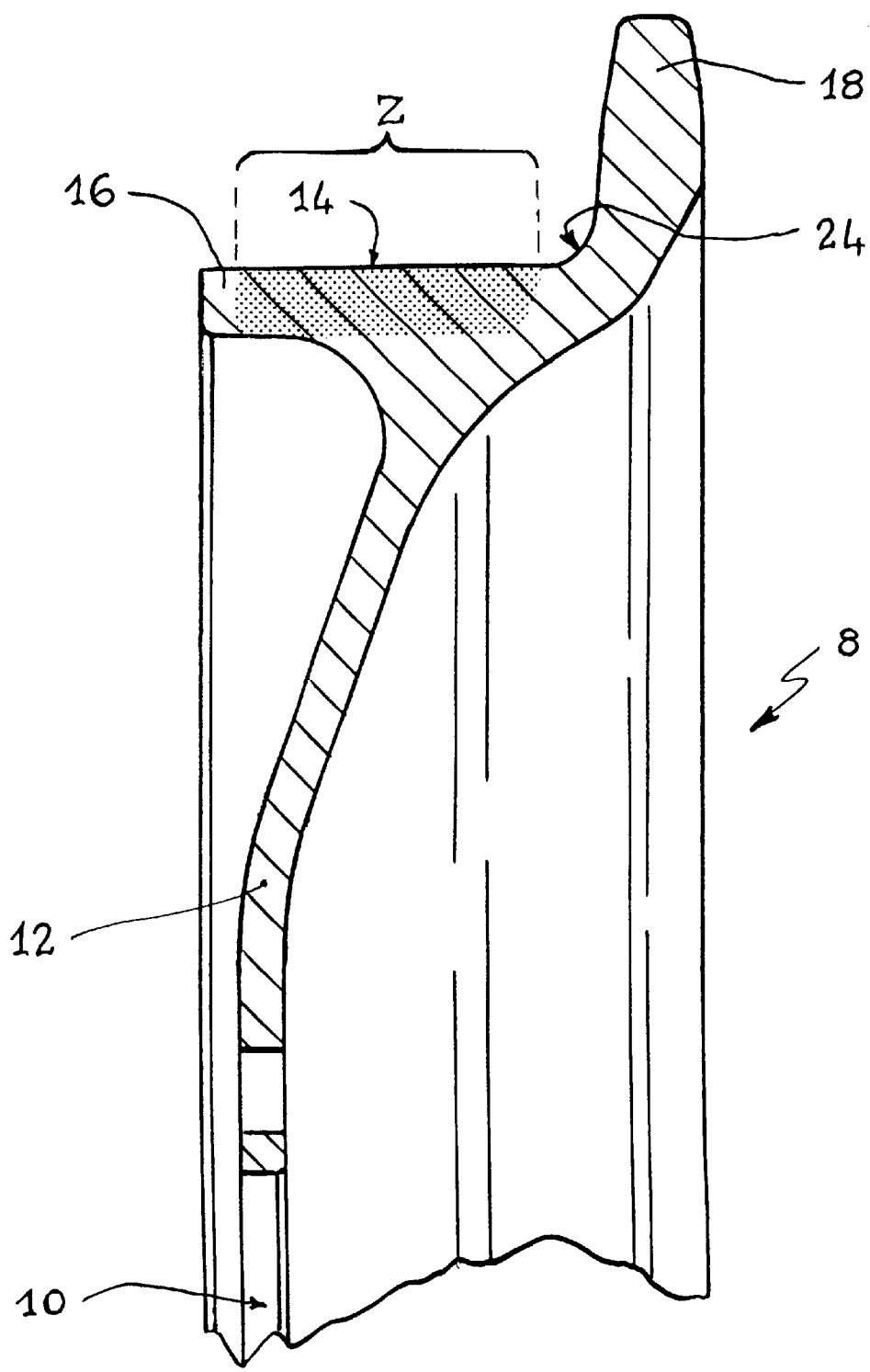
FIG. 3 is a partial diametral sectional view showing a safety wheel according to the invention, obtained in accordance with the method illustrated in FIG. 2.

FIG. 2 illustrates one of the phases of a method of manufacturing a safety wheel 8 of FIG. 1, while FIG. 3 shows the wheel 8 thus obtained.

One such safety wheel 8 is manufactured firstly by producing a blank, designated by reference 8' in FIG. 2 and whose profile is similar to that of the final wheel. As shown in FIG. 3, this wheel 8 comprises, in known manner, a central hub 10 for fixation to the axle of a pneumatic tire 4, from which hub an intermediate web 12 terminating in an outer peripheral zone 14 forming rim, extends.

This latter comprises a braking portion 16, or table, of cylindrical shape, which is extended at one end by a guiding portion or flange 18, projecting radially outwardly. Once the safety wheel is mounted on the bogie, the flange 18 is adjacent the chassis 6. In operation, the table 16 is adapted to receive the action of a mechanical braking member (not shown), and it will take the place of the tire 4 if the latter should puncture, while the flange 18 allows guiding of the bogie during switching.

The blank 8' is made of a carbon steel, for example in accordance with type R2 of standard UIC 812-3, which is the steel constituting the prior art safety wheels. This steel may also be in accordance with type R8 of this same standard.

According to an advantageous variant, one or the other of these two steels can be used, whose silicon, molybdenum and chromium contents by weight can be increased respectively up to 0.7% of silicon, 0.120% of molybdenum and 0.4% of chromium.

The first phase of treatment of the blank 8' consists firstly in heating it, in order to take it above the temperature of austenitization of the steel which constitutes it, i.e. about 850°. The blank thus heated is then subjected to a phase of local tempering, illustrated in FIG. 2.

To that end, the blank 8' is placed on a central stand 20, in a substantially horizontal position, namely its principal plane P is disposed horizontally. It should be noted that the flange 18 is located above the table 16. The latter is surrounded, over the whole of its periphery, by nozzles 22 projecting a cooling liquid, for example water. The zone subjected to the action of the nozzles is designated by reference Z. This makes it possible to effect a local tempering of this table 16, for a duration of about 5 to 15 minutes, so as to reduce the temperature by about 700° C.

Being given that the flange 18 is placed above the table 16, during the tempering of the latter, it is not subjected to the action of the cooling water, which flows by gravity in the direction opposite this flange. Consequently, the latter cools naturally in the ambient air, substantially without outside thermal action, as in the framework of the standardized treatment.

Once the local tempering of the table 16 has been effected, the blank is heated to a temperature of between 400 and 500° C., for a duration of between 1 and 2 hours. This makes it possible to effect an annealing of the table 16 subjected to tempering. Being given that the flange 18 has not been subjected to such a tempering, this phase of subsequent heating is globally without action on its properties, so that the treatment undergone by the flange is similar to the so-called standardized treatment.

The fact of subjecting the blank 8' to a localized tempering of the table 16, then of effecting an annealing thereof, leads to the formation of a safety wheel 8 whose hardness is not identical at all points. Referring to FIG. 3, the table 16 presents, in the region Z subjected to the action of the cooling nozzles 22, a hardness of between 1000 and 1050 MPa, viz. between 293 and 311 on the Brinell scale.

On the other hand, the flange 18 presents, at its end opposite the table 16, a hardness similar to that of the safety wheels of the prior art, namely of between 700 and 750 MPA, viz. 195 to 220 on the Brinell scale. The hardness of the whole of the outer peripheral zone 14 varies progressively between the table 16 and the flange 18. By way of example, the connecting portion 24, whose cross-section is in the form of an arc of circle, presents a hardness of between 825 and 875 MPa, viz. between 230 and 245 on the Brinell scale.

The objects mentioned above are achieved by the present invention. In effect,the safety wheel according to the invention presents a braking portion whose hardness is greater than that of the prior art wheels. This makes it possible to give this braking portion a greater mechanical strength and therefore to increase its longevity compared to the prior art. The safety wheel according to the invention presents a lifetime at least double that of a prior art wheel, when these two wheels are made of the same steel.

Moreover, the wheel according to the invention presents a guiding portion whose hardness is substantially similar to that of the prior art wheels. Consequently, this guiding portion will not damage the switches with which it comes into contact. In effect, if this guiding portion presented a hardness similar to that of the braking portion of the wheel of the invention, this guiding portion would be very fragile and would degrade the switches.

The use of a steel including up to 0.700% of silicon, 0.120% of molybdenum and 0.400% of chromium is advantageous. In effect, compared to those used in the prior art, such a steel is better suited to the operations of local tempering and annealing included in the method of the invention.

Once the local tempering of the braking portion has been effected, heating of the whole of the blank, including the guiding portion, proves advantageous in terms of convenience of implementation of the method. Moreover, such heating does not modify the properties of this guiding portion.

What is claimed is:

1. A subway coach bogie comprising pneumatic tires on which the bogie runs, a chassis resting on the tires, and safety wheels, each of which is interposed between the chassis and a corresponding one of said tires, wherein each safety wheel presents an outer peripheral zone comprising a cylindrical braking portion which is adapted to receive the action of a mechanical braking member, and which contacts a rail only when said corresponding pneumatic tire becomes flat, said braking portion being normally out of contact with the rail, and a guiding portion which projects radially outwardly from the braking portion, and which normally is in contact with the rail, wherein, in the Brinell scale, the hardness of the braking portion is included between 293 and 311, while the hardness of the guiding portion is included between 195 and 220, and wherein the entire wheel, including said braking portion and said guiding portion, is of the same chemical composition.

2. The subway coach bogie of claim 1, wherein the safety wheel is made of carbon steel, in according with type R2 or type R8 of standard UIC 812-3.

3. The subway coach bogie of claim 2, wherein said carbon steel includes, by weight, up to 0.700% of silicon, up to 0.120% of molybdenum and up to 0.400% of chromium.

* * * * *